United States Patent
Herzi et al.

(10) Patent No.: US 8,078,858 B2
(45) Date of Patent: Dec. 13, 2011

(54) MANUFACTURING BOOT PROCESS WITH MINIMAL COMPONENT INITIALIZATION

(75) Inventors: Dirie Herzi, Round Rock, TX (US); Madhusudhan Rangarajan, Round Rock, TX (US); Bi-Chong Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 728 days.

(21) Appl. No.: 12/178,887

(22) Filed: Jul. 24, 2008

(65) Prior Publication Data
US 2010/0023737 A1    Jan. 28, 2010

(51) Int. Cl.
*G06F 15/177*    (2006.01)

(52) U.S. Cl. .................................. 713/1; 713/2

(58) Field of Classification Search ............. 713/1, 2
See application file for complete search history.

(56) References Cited

U.S. PATENT DOCUMENTS

| | | | |
|---|---|---|---|
| 5,958,049 A * | 9/1999 | Mealey et al. | 713/1 |
| 5,978,913 A * | 11/1999 | Broyles et al. | 713/2 |
| 6,766,474 B2 * | 7/2004 | Schelling | 714/36 |
| 6,839,836 B2 * | 1/2005 | Cole et al. | 713/2 |
| 7,127,603 B2 | 10/2006 | Rangarajan et al. | |
| 7,555,677 B1 * | 6/2009 | Wiley et al. | 714/36 |
| 2004/0255197 A1 * | 12/2004 | Schelling | 714/36 |

* cited by examiner

*Primary Examiner* — Chun Cao
(74) *Attorney, Agent, or Firm* — Haynes and Boone, LLP

(57) ABSTRACT

A test mode initialization system includes beginning a power-on self-test (POST) wherein the POST may be performed to determine whether a system under test is in a quick test mode, and in response to being in the quick test mode, initialize only a portion of all memory in the system under test and initialize only a portion of a plurality of central processor unit (CPU) cores.

20 Claims, 3 Drawing Sheets

US 8,078,858 B2

MANUFACTURING BOOT PROCESS WITH MINIMAL COMPONENT INITIALIZATION

BACKGROUND

The present disclosure relates generally to information handling systems, and more particularly to a test mode initialization for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include large amounts of memory and/or multiple central processing units (CPUs). Having large amounts of memory and/or multiple CPUs generally causes startup of the IHS to take a longer time to boot up (initialize on power-up) than IHSs with less memory and a single CPU. In an IHS manufacturing environment, this slow boot period may amount to a significant amount of time on the assembly line waiting for the IHS to boot-up. This problem is compounded with multiple boots/reboots for testing different systems of the IHS during the manufacturing process of the IHS.

Accordingly, it would be desirable to provide an improved test mode initialization absent the disadvantages discussed above.

SUMMARY

According to one embodiment, a test mode initialization system includes beginning a power-on self-test (POST) wherein the POST may be performed to determine whether a system under test is in a quick test mode, and in response to being in the quick test mode, initialize only a portion of all memory in the system under test and initialize only a portion of a plurality of central processor unit (CPU) cores.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
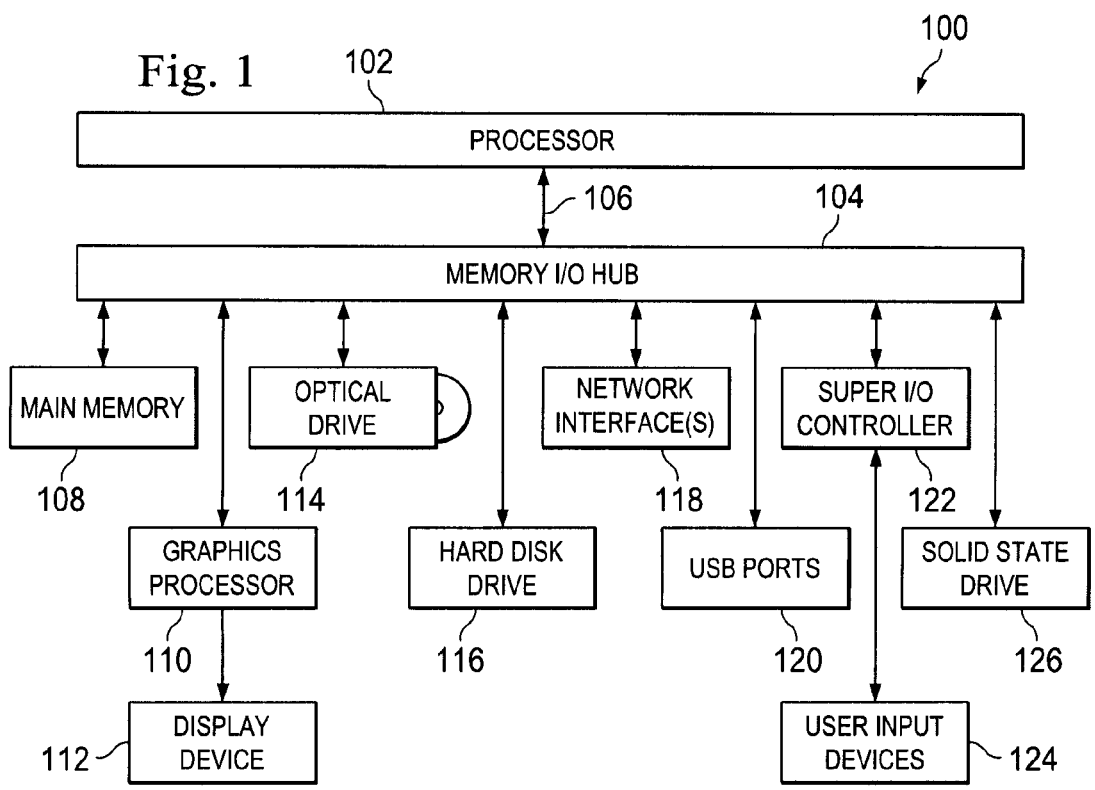
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
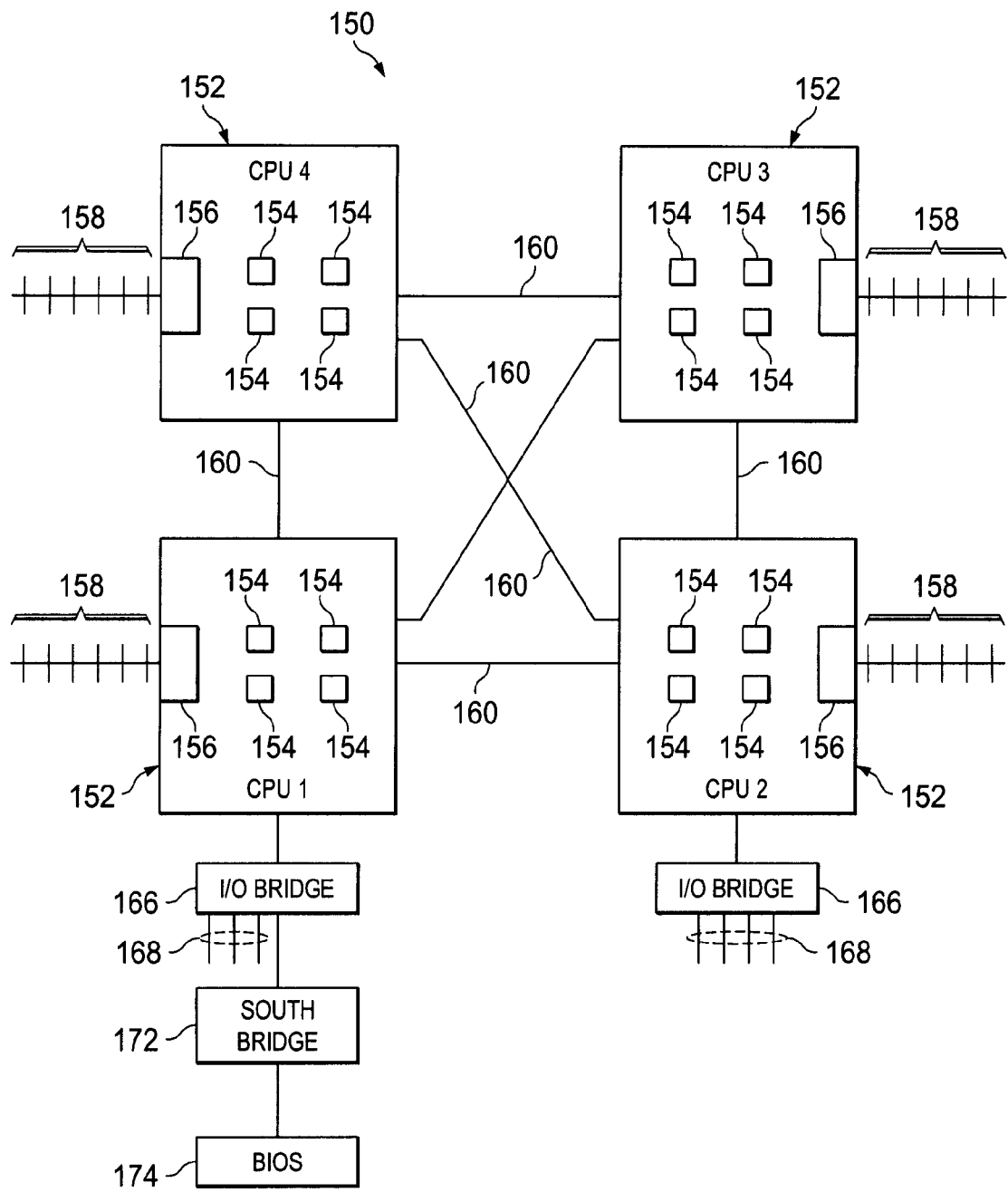
FIG. 2 illustrates a block diagram of an embodiment of an IHS having multiple CPUs and corresponding memory.

FIG. 2 illustrates a block diagram of an embodiment of an IHS 150 having multiple CPUs 152 and corresponding memory 154. The IHS 150 may be substantially similar to the IHS 100 shown in FIG. 1. In other words, the IHS 100 of FIG. 1 may be configured having multiple processors 102, multiple memory devices 108, and/or a variety of other components. In an embodiment, the IHS 150 is configured to perform server operations. As should be readily understood by a person having ordinary skill in the art, server operations are generally communicating with other IHSs and responding to their requests. However other operations may be performed by the IHS 150.

The CPUs 152 may include any number of processor cores 154. A processor core allows the CPU 152 to run multiple operations concurrently. The CPUs 152 may include a memory controller 156 that manages the flow of data to and from the memory sticks 158. The term memory stick is used for simplicity. In an embodiment, the memory sticks 158 may be dual in-line memory modules (DIMMs), but other types of memory may be used. The IHS 150 may include any number and type of memory sticks 158. CPU communication buses 160 couple the plurality of CPUs 152 and allow the CPUs 152 to communicate between the CPUs 152.

The IHS 150 also includes one or more I/O bridges 166 to manage input/output (I/O) devices, such as a display device 112, a keyboard, a mouse and/or a variety of other I/O devices. The I/O devices couple with the I/O bridge 166 via a plurality of I/O slots 168. Additionally, the IHS 150 includes a south bridge 172 coupled with a basic input/output system (BIOS) 174. In an embodiment, the IHS 100 or 150 may include one or more north bridges (not shown) that may be embedded in the CPUs 152. The BIOS 174 generally refers to a firmware code that is ran by the IHS 100, 150 when the IHS 100, 150 is first powered on. A function of the BIOS 174 is to identify and initialize components of the IHS 100, 150, such as the optical drive 144, the hard disk drive 116, the memory 108, 158, and/or a variety of other components. The initialization generally prepares the IHS 100, 150 so that other software programs can load, execute, and assume control of the IHS 100, 150. This process is known as booting, booting-up and/or bootstrapping. In other words, a boot sequence during boot up is an initial set of operations that an IHS 100, 150 performs when it is powered on.

The amount of time for a boot up is generally proportional to the number of processors/CPUs 102, 152, the amount of memory 108, 158 and the number and type of components coupled to the IHS 100, 150. Therefore, in an IHS manufacturing environment where initial system testing is performed to determine if all of the proper components and software are installed and working properly, the IHS 100, 150 may be booted several times during the build process to test different components or different software. As a result, any time saved during manufacturing self tests or quick tests can reduce total wait time during the build process.

An embodiment of the present disclosure provides a manufacturing mode setting (e.g., sets a flag) in a BIOS non-volatile memory. The flag may be a "Minimum Configuration Mode" setting. Thus, the flag, when set, informs the BIOS 174 that the IHS 100, 150 is in a minimum configuration manufacturing mode. When the flag is set, the BIOS 174 may initialize a minimum amount of CPU cores 154, a minimum amount of memory 108, 158 and/or a minimum amount of other components to perform the desired tests. For example, in an embodiment, the BIOS will initialize/configure a portion of the CPU cores 154 (e.g. one CPU core 154), and/or a portion of the memory 108, 158 (e.g., one memory stick 158) and/or a portion of the other components (e.g., only the graphics processor 110, I/O devices 124, network interfaces 118, and/or a variety of other devices) to complete the desired tests on the IHS 100, 150 during the quick test. The IHS manufacturer may set/clear the flag using traditional CMOS token mechanisms. The IHS manufacturer may determine which boots need all the memory and set/clear the bit appropriately. In addition, the flag may be set by the component manufacturer (e.g., BIOS manufacturer, processor manufacturer, and/or the like) to save time for the IHS manufacturer on first boot up of the IHS 100, 150. Even thought the system may only initialize a portion of all of the CPU cores 154, memory 158, and/or components, the system may still report that all of the CPU cores 154, memory 158, and/or components are present and initialized so that the BIOS system can continue with the self test as if everything is initialized and present. Thus, the testing that can be performed in the quick test should be testing of components/software that only needs a minimum of the actually initialized components (e.g., CPU cores 154, memory 158 and etc.).

When the quick test flag is clear (not set), the BIOS 174 may boot the IHS 100, 150 system normally (e.g., a full boot of all the memory 108, 158, all the CPU cores 102, 152 and/or all of the connected components). Therefore, in an embodiment, the system initialization checks a "Minimum Configuration Mode" flag and if the flag is set, configures a minimum CPU/DIMM configuration If the flag is clear, the system is configured normally. The system may then boot to an operating system.

Booting in a minimum configuration mode may allow the CPU and memory configuration to be done in just a few seconds as opposed to a few minutes for a large system. As such, if this can be done for multiple reboots, it potentially saves multiple minutes per system during the factory quick tests of the IHS 100, 150. This may result in saving total manufacturing/testing time and thus result in cost savings. Because low-end (few CPUs and less memory) and high-end (a plurality of CPUs and more memory) IHSs 100, 150 may now have similar POST times, the IHS manufacturer may consolidate low and high end manufacturing because there will no longer be a significant difference in POST times between low-end and high-end IHSs 100, 150 (e.g., servers). The IHS manufacturer may check the configuration of the IHS 100, 150.

Figure 3:
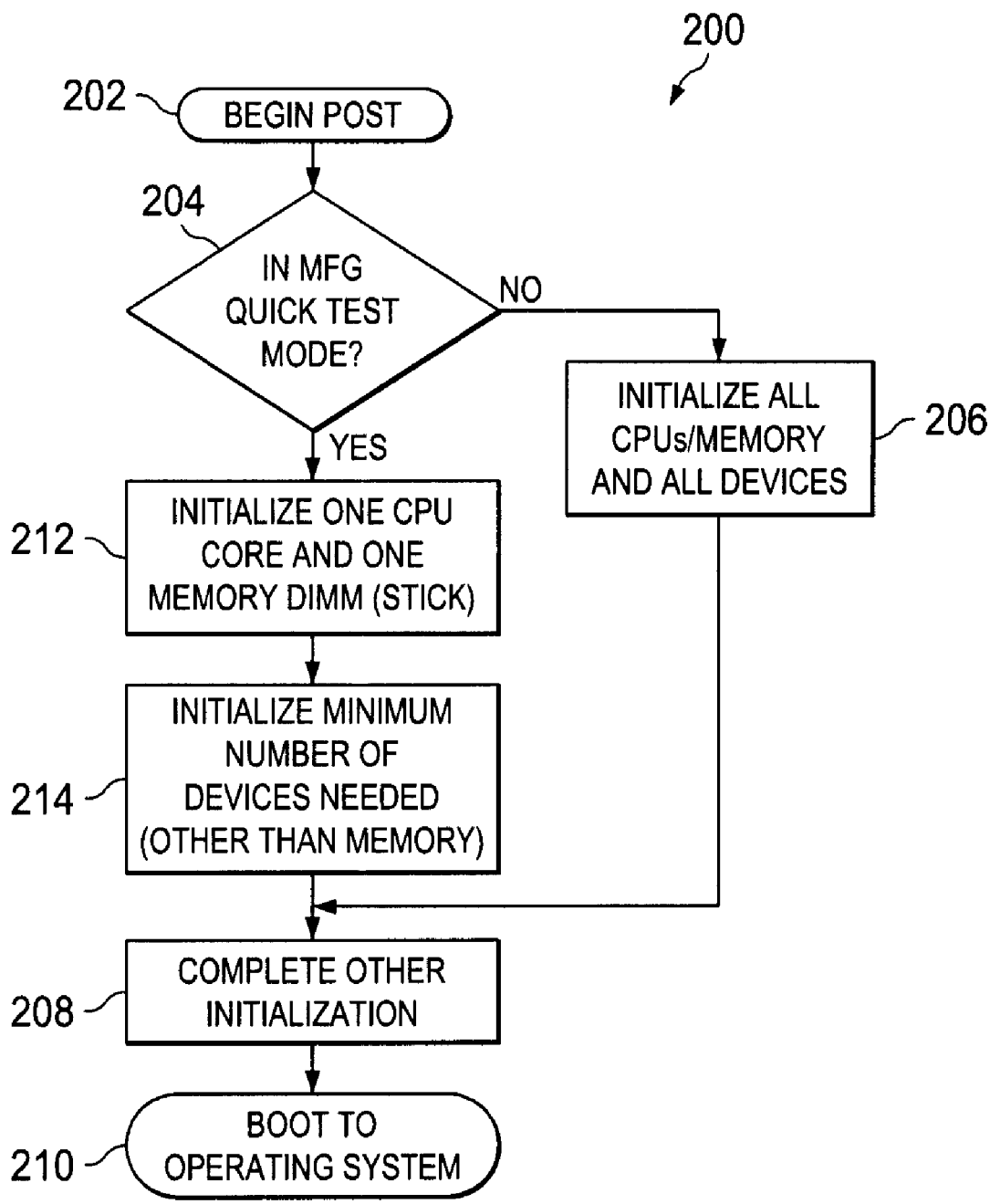
FIG. 3 illustrates a flowchart of an embodiment of a method to decrease initialization time for an IHS.

FIG. 3 illustrates a flowchart of an embodiment of a method 200 to decrease initialization time for an IHS 100, 150. The method 200 begins at 202 where the method 200 begins a POST. The method 200 then proceeds to decision block 204 where the method 200 determines whether the IHS 100, 150 is in a manufacturing quick test mode (e.g., the "Minimum Configuration Mode" flag is set). If no, the system is not in a manufacturing quick test mode, the method 200 proceeds to block 206 where the method 200 initializes all of the CPUs 152 and all of the memory 158. The method 200 then proceeds to block 208 where the method 200 initializes any other desired initialization. The method 200 then proceeds to block 210 where the method 200 ends as the IHS 100, 150 boots to an operating system. On the other hand, if yes, the system is in a manufacturing quick test mode, the method proceeds to block 212 where the method 200 initializes a portion of a plurality of all CPU cores 154 and a portion of a plurality of all memory devices 158. In an embodiment, the un-initialized CPUs 152, cores 154, memory 158 and/or devices are ignored, but reported to the BIOS 174 as being present and initialized for build verification to satisfy a build requirement. The verification may be visual verification and/or software verification. The method 200 then proceeds to block 214 where the method 200 initializes a minimum number of devices coupled with the IHS 100, 150 that are needed to perform a particular test of the IHS 100, 150. Thus, the IHS 100, 150 can proceed with the quick test using the initialized parts of the IHS 100, 150. The method 200 then proceeds to block 208 and continues as described above. It should be understood that the method 200 may initialize any number of CPUs 152/cores 154 and/or any number of memory devices 158 and/or any number and type of devices when the method 200 determines that the IHS 100, 150 is in the manufacturing quick test mode.

Determining a minimum architecture to be initialized may be dependent on what are the minimum devices used to perform the test for configuration (e.g., to test for proper manufacturing and/or software installation). Reporting may be performed by the BIOS 174 using SMBIOS or other tables in system memory. There may any number of quick tests performed on the IHS 100, 150 during and after the manufacturing process to test various aspects of the IHS 100, 150 and/or the software.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A information handling system (IHS) manufacturing boot process system comprising one or more subsystems to:
   begin a power-on self-test (POST);
   determine whether a system under test is in a manufacturing quick test mode; and
   in response to being in the manufacturing quick test mode:
      initialize only a portion of all memory in the system under test;
      initialize only a portion of a plurality of central processor unit (CPU) cores in the system under test; and
      boot the system under test to an operating system in order to perform an manufacturing test, wherein the remaining portion of the memory in the system under test and the remaining portion of the plurality of CPU cores in the system under test are not initialized.

2. The system of claim 1, further comprising:
   in response to being in the manufacturing quick test mode, initialize a minimum number of devices coupled to the system under test to perform a specific self-test of the system under test.

3. The system of claim 1, further comprising:
   in response to being in the manufacturing quick test mode, report as initialized the remaining portion of the memory in the system under test that was not initialized.

4. The system of claim 1, further comprising:
   in response to being in the manufacturing quick test mode, report as initialized the remaining portion of the plurality of CPU cores in the system under test that were not initialized.

5. The system of claim 1, wherein determining whether the system under test is in a manufacturing quick test mode includes finding a flag bit in non-volatile memory of the system under test for the manufacturing quick test mode.

6. The system of claim 1, wherein reporting is performed using a basic input/output system (BIOS).

7. The system of claim 1, further comprising:
   in response to not being in the manufacturing quick test mode:
      initializing all of the memory in the system under test; and
      initializing all of the plurality of CPU cores in the system under test.

8. An information handling system (IHS) comprising:
   a multi-core central processor unit (CPU);
   a plurality of memory modules; and
   a manufacturing boot process system comprising one or more subsystems to:
      begin a power-on self-test (POST);
      determine whether the IHS is in a manufacturing quick test mode; and
      in response to being in the quick test mode:
         initialize only a portion of the plurality of memory modules;
         initialize only a portion of CPU cores; and
         boot the IHS to an operating system in order to perform an manufacturing test, wherein the remaining portion of the plurality of memory modules and the remaining portion of the plurality of CPU cores are not initialized.

9. The IHS of claim 8, further comprising:
   in response to being in the manufacturing quick test mode, initialize a minimum number of devices coupled to the IHS to perform a specific self-test of the IHS.

10. The IHS of claim 8, further comprising:
    in response to being in the manufacturing quick test mode, reporting as initialized the remaining portion of the plurality of memory modules in the system that were not initialized.

11. The IHS of claim 8, further comprising:
    in response to being in the manufacturing quick test mode, reporting as initialized the remaining portion of the plurality of CPU cores that were not initialized.

12. The IHS of claim 8, wherein determining whether the IHS is in a manufacturing quick test mode includes finding a flag bit in non-volatile memory of the IHS for the manufacturing quick test mode.

13. The IHS of claim 8, wherein reporting is performed using a basic input/output system (BIOS).

14. The IHS of claim 8, further comprising:
    in response to not being in the quick test mode:
       initializing all of the plurality of memory modules; and
       initializing all of the plurality of CPU cores.

15. A method to initialize an information system comprising:
    beginning a power-on self-test (POST);
    determining whether a system under test is in a manufacturing quick test mode;
    in response to being in the manufacturing quick test mode:
       initializing only a portion of all memory in the system under test;
       initializing only a portion of a plurality of central processor unit (CPU) cores in the system under test; and
       booting the system under test to an operating system in order to perform an manufacturing test, wherein the remaining portion of the memory and the remaining portion of the plurality of CPU cores are not initialized.

16. The method of claim 15, further comprising:
    in response to being in the manufacturing quick test mode, initializing a minimum number of devices coupled to the system under test to perform a specific self-test of the system under test.

17. The method of claim 15, further comprising:
    in response to being in the manufacturing quick test mode, reporting as initialized the remaining portion of all memory in the system that was not initialized.

18. The method of claim 15, further comprising:
    in response to being in the manufacturing quick test mode, reporting as initialized the remaining portion of the plurality of CPU cores that were not initialized.

19. The method of claim 15, wherein determining whether the system under test is in a manufacturing quick test mode includes finding a flag bit in non-volatile memory of the system under test for the manufacturing quick test mode.

20. An information handling system (IHS) comprising:
    a multi-core central processor unit (CPU) including a plurality of CPU cores;

a plurality of memory modules; and
a manufacturing boot process system comprising one or more subsystems to:
  begin a power-on self-test (POST);
  determine whether the IHS is in a manufacturing quick test mode;
  in response to being in the manufacturing quick test mode:
    initialize only a portion of the plurality of memory modules;
    initialize only a portion of the plurality of CPU cores;
    report as initialized all of the plurality of memory modules, including the portion of the plurality of memory modules that were not initialized;
    report as initialized all of the plurality of CPU cores, including the portion of the plurality of CPU cores that were not initialized; and
    booting the IHS to an operating system in order to perform an manufacturing test, wherein the remaining portion of the plurality of memory modules and the remaining portion of the plurality of CPU cores are not initialized; and
  in response to not being in the manufacturing quick test mode, initialize all of the plurality of memory module and all of the plurality of CPU cores.

* * * * *